United States Patent
Peters et al.

(10) Patent No.: US 6,842,622 B2
(45) Date of Patent: Jan. 11, 2005

(54) USER INTERFACE USING SPEECH GENERATION TO ANSWER CELLULAR PHONES

(75) Inventors: Mark E. Peters, Chapel Hill, NC (US); Sandeep K. Singhal, Englewood Cliffs, NJ (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 09/894,054

(22) Filed: Jun. 28, 2001

(65) Prior Publication Data

US 2003/0003926 A1 Jan. 2, 2003

(51) Int. Cl.[7] .................................... H04Q 7/20
(52) U.S. Cl. .................... 455/458; 455/412.2; 455/567
(58) Field of Search ............................. 455/567, 412.1, 455/412.2, 412.3, 564, 575.1

(56) References Cited

U.S. PATENT DOCUMENTS

| | | | | |
|---|---|---|---|---|
| 5,596,634 A | * | 1/1997 | Fernandez et al. | 379/210.01 |
| 5,754,627 A | * | 5/1998 | Butler et al. | 455/414.1 |
| 6,018,671 A | * | 1/2000 | Bremer | 455/567 |
| 6,501,751 B1 | * | 12/2002 | Leviton et al. | 370/352 |

* cited by examiner

Primary Examiner—CongVan Tran
Assistant Examiner—Kiet Ie
(74) Attorney, Agent, or Firm—A. Bruce Clay; Yee & Associates, P.C.

(57) ABSTRACT

A method, computer program product, and system for answering a wireless telephone is provided. In one embodiment, the wireless telephone receives an incoming call and then determines whether the user has placed the phone in automatic call answering mode. If it is determined that automatic call answering has been selected by a user, then the phone answers the incoming call by providing the calling party with an indication that the user will take the call momentarily, such as by sending a voice message indicating that the user is busy but will take the call momentarily and instructing the calling party to not hang up. The phone also places itself into mute mode until the user has taken the incoming call to prevent the calling party from overhearing conversations that may be taking place around the user until the user has determined that it is convenient to take the phone call. In other embodiments, the wireless telephone allows the user to carry on conversations without speaking through selection of appropriate prerecorded or generated phrases.

42 Claims, 4 Drawing Sheets

USER INTERFACE USING SPEECH GENERATION TO ANSWER CELLULAR PHONES

BACKGROUND OF THE INVENTION

1. Technical Field

The present invention relates generally to wireless telephones and, more particularly, to methods of discrete automatic answering of received phone calls.

2. Description of Related Art

The use of computers has become more and more pervasive in society. This pervasiveness includes the integration of personal computer technology into phones. By utilizing computer technology, users or callers have access to computing functions and resources in a personal, portable device. In addition, it is envisioned that phone users would be able to use some of the same software elements in a phone that are used at home or in the office. Various applications have been developed and are being developed for use in phones. These applications generally include communication applications to help a user stay in touch with other persons at home or in the office, such as voice mail, e-mail, or two-way paging with short text messages. Some phones incorporate so-called personal information manager (PIM) technology, such as an address book, phone lists, or a calendar for scheduling personal events.

Another adopted computer technology for use on a phone is voice and speech recognition. Voice recognition technology is already well developed in multimedia desktop personal computers and, when incorporated into a phone, allows a phone user to easily control and interact with a telephone application, such as automatically dialing a phone number, while obviating the need for manual input. Phones are becoming so ubiquitous that many people carry their phones so that they have some means for being in constant communication contact with others. Examples of common use of portable phones include carrying and using a phone within an automobile or possibly carrying the phone while shopping in a mall.

However, as phone have become so ubiquitous, their presence in certain situations may pose a nuisance to others around the user or may cause embarrassment to the user. For example, if a user is in a meeting when the his or her cell phone rings, the user has the option of answering the call during the meeting which disturbs everyone else and renders the user's conversations less than private, or the user may choose to get up and leave the meeting before answering the call. However, during the process of leaving the meeting, the caller may hang up before the user has a chance to answer the call. Thus, the user has been prevented from receiving the call which may have been very important and a call for which the user desires to talk to the caller rather than allowing voice mail to pick up. Therefore, it would be desirable to have a method for answering phone calls that is less disturbing to others than is provided by the current method.

SUMMARY OF THE INVENTION

The present invention provides a method, computer program product, and system for answering a wireless telephone. In one embodiment, the wireless telephone receives an incoming call and then determines whether the user has placed the phone in automatic call answering mode. If it is determined that automatic call answering has been selected by a user, then the phone answers the incoming call by providing the calling party with an indication that the user will take the call momentarily, such as by sending a voice message indicating that the user is busy but will take the call momentarily and instructing the calling party to not hang up. The phone also places itself into mute mode until the user has taken the incoming call to prevent the calling party from overhearing conversations that may be taking place around the user until the user has determined that it is convenient to take the phone call. In other embodiments, the wireless telephone allows the user to carry on conversations without speaking through selection of appropriately prerecorded or generated phrases.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
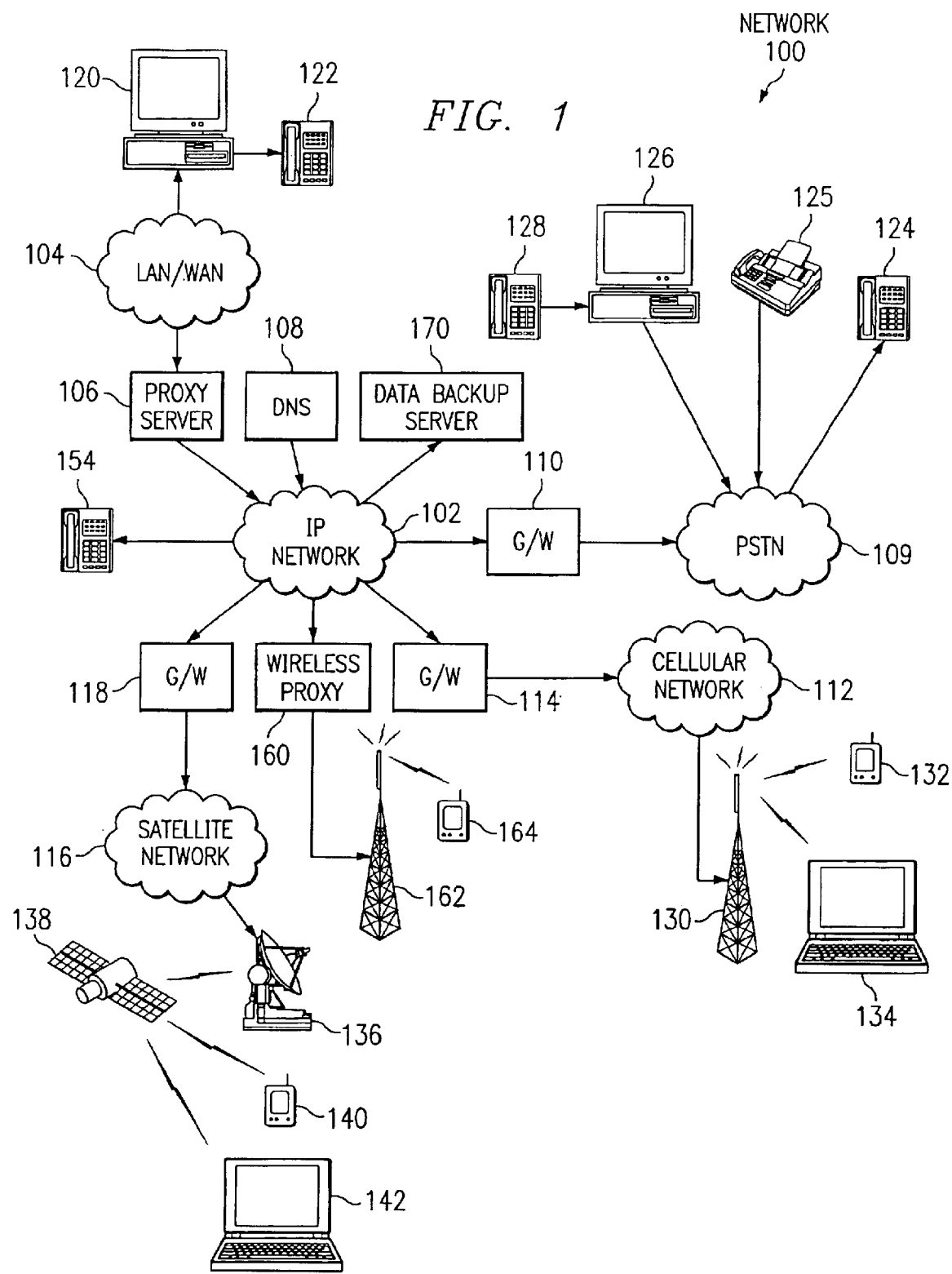
FIG. 1 depicts a system diagram illustrating a plurality of interconnected heterogeneous networks in which the present invention may be implemented.

With reference now to the figures, and in particular with reference to FIG. 1, a system diagram illustrating a plurality of interconnected heterogeneous networks in which the present invention may be implemented is depicted. As illustrated, an Internet Protocol (IP) network 102, a Local Area Network (LAN)/Wide Area Network (WAN) 104, the Public Switched Telephone Network (PSTN) 109, a cellular wireless network 112, and a satellite communication network 116 make up the plurality of heterogeneous networks serviced by the personal mobility system of the present invention.

IP network 102 may be the publicly available IP network, a private IP network, or a combination of public and private IP networks. In any case, IP network 102 operates according to the Internet Protocol and routes packets among its many switches and through its many transmission paths. IP networks are generally known in the art to be expandable, fairly easy to use and heavily supported. Coupled to IP network 102 is a Domain Name Server (DNS) 108 to which queries may be sent, such queries each requesting an IP address based upon a Uniform Resource Locator (URL). IP network 102 supports 32 bit IP addresses as well as 128 bit IP addresses, which are currently in the planning stage.

LAN/WAN 104 couples to IP network 102 via a proxy server 106 (or another connection). LAN/WAN 104 may operate according to various communication protocols, such as the Internet Protocol, the Asynchronous Transfer Mode (ATM) protocol, or other known packet switched protocols. Proxy server 106 serves to route data between IP network 102 and LAN/WAN 104. A firewall that precludes unwanted communications from entering LAN/WAN 104 may also be located at the location of proxy server 106.

Computer 120 couples to LAN/WAN 104 and supports communications with LAN/WAN 104. Computer 120 may employ the LAN/WAN and proxy server 106 to communicate with other devices across IP network 102. Such communications are generally known in the art and will not be further described herein except to expand upon the teachings of the present invention. As is also shown, phone 122 couples to computer 120 and may be employed to initiate IP Telephony communications with another phone or voice terminal using IP Telephony. In such an IP telephony system, a gatekeeper 152 is deployed by a service provider to manage IP telephony for its users. An IP phone 154 connected to IP network 102 (or other phone, e.g., phone 124) may communicate with phone 122 using IP telephony.

PSTN 109 is a circuit switched network that is primarily employed for voice communications, such as those enabled by a standard phone 124. However, PSTN 109 also supports the transmission of data. Data transmissions may be supported to a tone based terminal, such as a FAX machine 125, to a tone based modem contained in computer 126, or to another device that couples to PSTN 109 via a digital connection, such as an Integrated Services Digital Network (ISDN) line, an Asynchronous Digital Subscriber Line (ADSL), or another digital connection to a terminal that supports such a connection. As illustrated, a voice terminal, such as phone 128, may couple to PSTN 109 via computer 126 rather than being supported directly by PSTN 109, as is the case with phone 124. Thus, computer 126 may support IP telephony with voice terminal 128, for example.

Cellular network 112 supports wireless communications with terminals operating in its service area (which may cover a city, county, state, country, etc.). As is known, cellular network 112 includes a plurality of towers, e.g., 130, that each service communications within a respective cell. Wireless terminals that may operate in conjunction with cellular network 112 include wireless handsets 132 and wirelessly enabled laptop computers 134, for example. Wireless handsets 132 could be, for example, personal digital assistants, wireless or cellular telephones, or two-way pagers. Cellular network 112 couples to IP network 102 via gateway 114.

Wireless handsets 132 and wirelessly enabled laptop computers 134 may communicate with cellular network 112 using a wireless application protocol (WAP). WAP is an open, global specification that allows mobile users with wireless devices, such as, for example, mobile phones, pagers, two-way radios, smartphones, communicators, personal digital assistants, and portable laptop computers, to easily access and interact with information and services almost instantly. WAP is a communications protocol and application environment and can be built on any operating system including, for example, Palm OS, EPOC, Windows CE, FLEXOS, OS/9, and JavaOS. WAP provides interoperability even between different device families.

WAP is the wireless equivalent of Hypertext Transfer Protocol (HTTP) and Hypertext Markup Language (HTML). The HTTP-like component defines the communication protocol between the handheld device and a server or gateway. This component addresses characteristics that are unique to wireless devices, such as data rate and round-trip response time. The HTML-like component, Wireless Markup Language (WML), defines new markup and scripting languages for displaying information to and interacting with the user. This component is highly focused on the limited display size and limited input devices available on small, handheld devices. For example, a typical cell phone may have only a 4×10-character display with 16-gray levels and only a numeric keypad plus up/down volume keys.

Cellular network 112 operates according to an operating standard, which may be the Advanced Mobile Phone System (AMPS) standard, the Code Division Multiple Access (CDMA) standard, the Time Division Multiple Access (TDMA) standard, or the Global System for Mobile Communications or Groupe Speciale Mobile (GSM), for example. Independent of the standard(s) supported by cellular network 112, cellular network 112 supports voice and data communications with terminal units, e.g., 132 and 134.

Satellite network 116 includes at least one satellite dish 136 that operates in conjunction with a satellite 138 to provide satellite communications with a plurality of terminals, e.g., laptop computer 142 and satellite handset 140. Satellite handset 140 could also be a two-way pager. Satellite network 116 may be serviced by one or more geosynchronous orbiting satellites, a plurality of medium earth orbit satellites, or a plurality of low earth orbit satellites. In any case, satellite network 116 services voice and data communications and couples to IP network 102 via gateway 118.

Wireless Proxy 160 is coupled to IP network 102 and is coupled to a plurality of towers, e.g., 162, which each provide wireless communications with wireless devices such as wireless device 164. Wireless Proxy 160 provides access to IP network 102 to wireless device 164, such as a personal digital assistants (PDA) or a wireless telephone, that may require proprietary or other special protocols in order to communicate with IP network 102. For example, wireless proxy server 160 may be a 3Com server utilizing 3Com protocols for communicating with a Palm VII, a handheld portable computing device available from 3Com Corporation in Santa Clara, Calif.

In a preferred embodiment of the present invention, wireless proxy 160 is a 3Com proxy server supporting communications with Palm VII personal organizer and portable computing device 164 is a Palm VII personal organizer. In this embodiment, communications between wireless proxy server 160 and portable computing device 164 is facilitated by the use of Palm Query Applications (PQAs). A PQA is like a mini-Web site that resides on portable computing device 164. That is, a PQA is a special kind of record database. A typical PQA contains an HTML form or a list of hyperlinks that request additional information either locally—on personal computing device 164—or remotely—on the Internet.

Much of the content on the Internet is designed to take advantage of the power of Pentium/RISC-class computers with large, high resolution color monitors and fast and cheap Internet access. In these circumstances, there is little reason to economize on the abundant connect time and large file size that make Web browsing such a rich, multimedia experience from a desktop or notebook computer.

However, this model is not the best model for a small, low-power computer like the Palm VII organizer with its tiny screen, battery powered operation, and relatively slow and expensive wireless connection to the Internet. Rather than duplicate the Web browsing model on a handheld computer, PQAs are developed that access targeted bits of Internet information—like clippings from a newspaper. Typically, a handheld computer user does not focus on following hyperlinks to the Internet (although this is available), but instead, they compose a simple query in the PQA (for example a request for a stock quote) and then send that query over the air.

FIG. 1 is intended as an example and not as an architectural limitation for the processes of the present invention.

Figure 2:
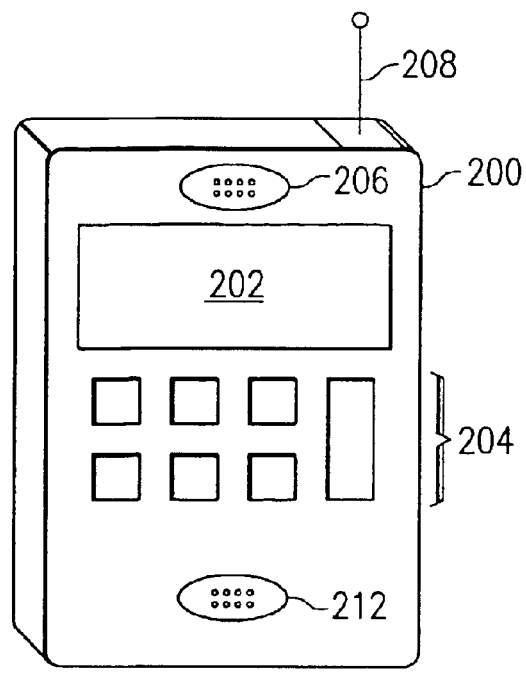
FIG. 2 depicts a pictorial diagram of a wireless telephone in accordance with a preferred embodiment of the present invention.

With reference now to FIG. 2, a pictorial diagram of a wireless telephone is depicted in accordance with a preferred embodiment of the present invention. Wireless telephone 200 includes a display 202 for presenting textual and graphical information. Display 202 may be a known display device, such as a liquid crystal display (LCD) device. The display may be used to present a map or directions, calendar information, a telephone directory, an electronic mail message, or the telephone number of a dialed party.

Wireless telephone 200 may also include keypad 204, speaker 206, antenna 208, and microphone 212. Keypad 204 may be used to receive user. Speaker 206 provides a mechanism for audio output, such as the voice audio of a party to whom the user of wireless telephone 200 may be speaking. Microphone 212 provides a mechanism for audio input such as for speaking to a called party. Antenna 208 provides a mechanism used in establishing a wireless communications link between wireless phone 200 and a network, such as network 102 in FIG. 1.

Figure 3:
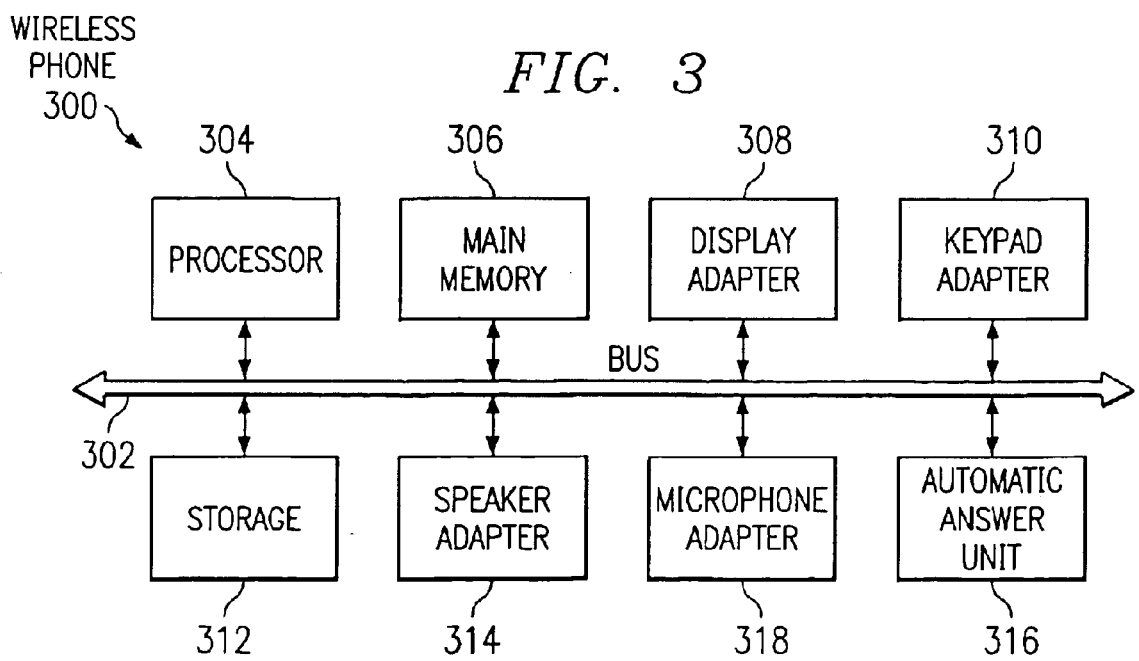
FIG. 3 depicts a block diagram of a wireless telephone in accordance with a preferred embodiment of the present invention.

Turning now to FIG. 3, a block diagram of a wireless telephone is depicted in accordance with a preferred embodiment of the present invention. Wireless telephone 300 is an example of a wireless telephone, such as wireless telephone 200 in FIG. 2, in which code or instructions implementing the processes of the present invention may be located. Wireless telephone 300 includes a bus 302 to which processor 304 and main memory 306 are connected. Display adapter 308, keypad adapter 310, storage 312, microphone adapter 318, audio adapter 314, and automatic answer unit 316 also are connected to bus 302.

Automatic answer unit 316 provides a mechanism to answer the telephone when the user is busy without requiring the user to speak or otherwise disturb those around the user and without allowing the caller to hear what is happening near the user until the user decides that it is convenient to answer the call his or herself. When a call is received and the phone 300 is in automatic answer mode, the automatic answer unit sends a prerecorded message to the caller indicating that the user will pick up the phone and speak with them momentarily and requesting that the caller not hang up. As the message is sent, the phone is also placed in mute mode such that no sounds on the user's end are picked up and transmitted to the caller until the user is ready to take the call.

The prerecorded message may say, for instance, "Please wait a moment while I find a convenient place to talk." The prerecorded message may be a recording made by the user or may be created using a voice generating engine well known in the art to create the message. Several messages may be available on the phone 300 and the user may select a particular message based on the circumstances or the phone 300 may select a message based, for example, on the time of day or the identity of the caller.

The automatic answer mode may be selected by the user by selecting from a menu or using a special key or key strokes. The user may select automatic answer mode prior to receiving calls or may choose to be notified of calls first and then, based possibly on the identity of the caller as displayed through caller ID on the phone display, the user may choose to place the phone 300 into automatic answer mode and move to a location more convenient for taking the call. Alternatively, if the caller ID reveals a non-urgent call or someone to whom the user does not wish to speak with immediately, the user can allow the call to go unanswered or allow a voice mail system to answer the call and take a message from the caller.

In some embodiments, Automatic Answer Unit 316 may provide a user with selectable phrase choices allowing the user to listen to a caller and provide answers to the caller without actually speaking by selecting an appropriate phrase. The automatic answer unit 316 then selects a prerecorded message or generates a message through a voice generating engine corresponding to the selected phrase and sends the voice message to the caller. Thus, through selection of appropriate preset phrases, a user can carry on a conversation with a caller without having to speak, thereby not disturbing others around him. The user may of course switch to actually speaking mode in which the user speaks at any time.

For example, perhaps the user is in a meeting when the phone rings. The user may wish to take the call because the caller ID indicates that the call is from the user's boss or secretary. The user could select, for example, from a menu, a choice to "Answer with 'I am in a meeting talking via voice phrases' message." The user may then select a voice phrase "What can I do for you? Please expect Yes/No answers" to be sent to the caller. The user could then carry on a conversation by listening to the caller and selecting "yes" or "no" as appropriate. The automatic answer unit 316 would send an audible "yes" or "no" to the caller in response to selection by the user.

In some embodiments, these messages and phrases may be preprogrammed, user voice programmed, or a mix of both. Furthermore, the user could connect the phone to a computer and use a computer application or browser plug-in to set the text and/or the voice to be supplied to callers. Alternatively, the computer could be used to seed the text with the voice added later during a setup call. The stored messages and voice could be stored on the telephone itself or on a telephone company operated proxy server.

An operating system runs on processor 304 and is used to coordinate and provide control of various components within wireless telephone 300 in FIG. 3. Instructions for the operating system and applications or programs are located on storage devices, such as storage 312, and may be loaded into main memory 306 for execution by processor 304.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3.

Figure 4:
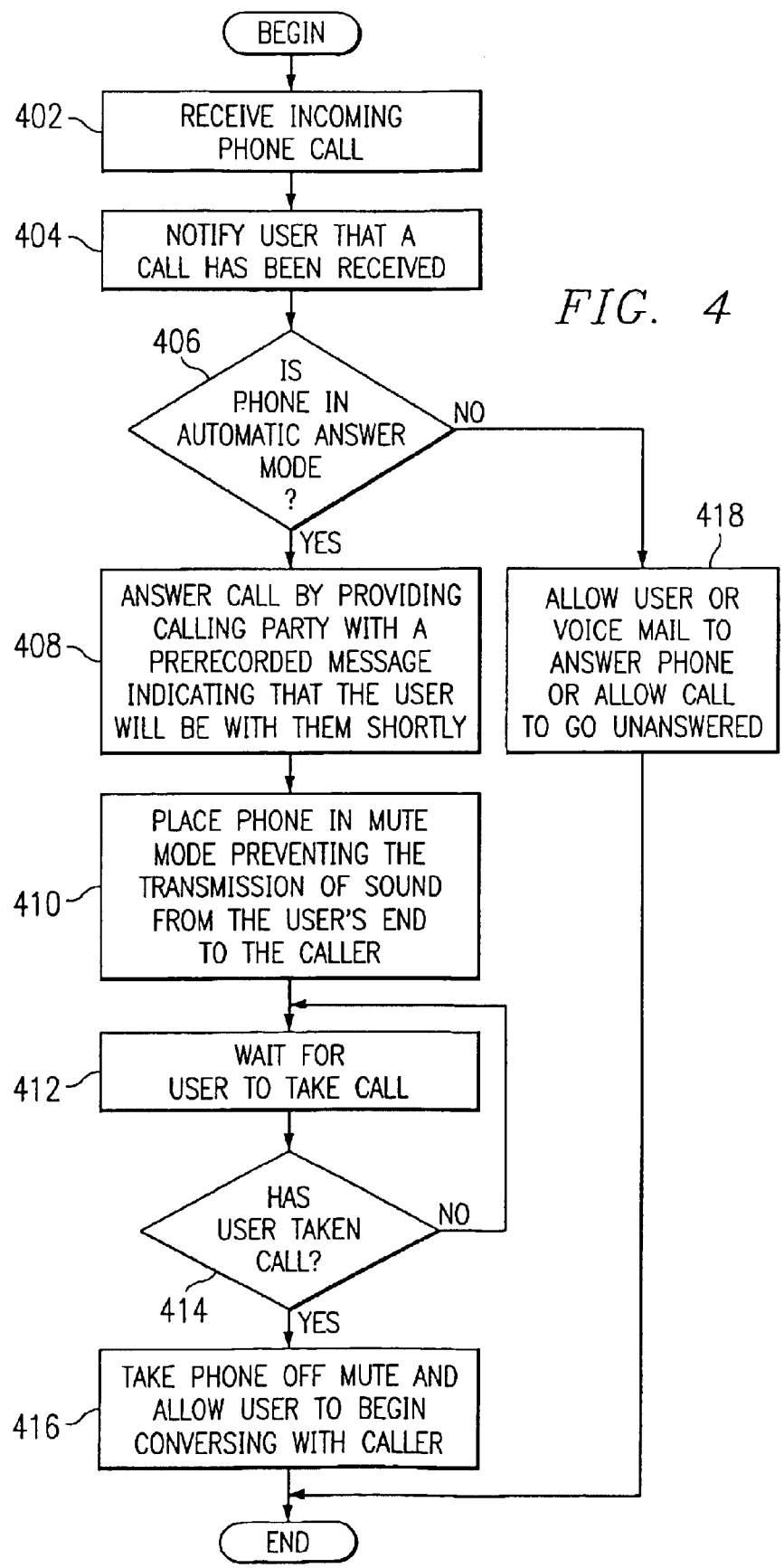
FIG. 4 depicts a process flow and program function for answering a telephone when a user is busy in accordance with the present invention.

With reference now to FIG. 4, a process flow and program function for answering a telephone when a user is busy is depicted in accordance with the present invention. This process flow may be implemented on a wireless phone such as, for example, wireless phone 300 in FIG. 3. To begin, the telephone receives an incoming phone call (step 402). The phone notifies the user that a call has been received (step 404) such as, for example, by causing the phone to vibrate and/or light up. The phone then determines whether the user has placed the phone in automatic answer mode (step 406). If the phone has been configured to allow the user to be notified of the phone call prior to placing the phone in automatic answer mode, the phone may present the user with a menu of options allowing the user to select whether he wishes to answer the phone, allow voice mail to answer the call, let the call go unanswered, or have the automatic answer system answer the phone allowing the user time to find a more convenient place to talk.

If the phone is not in automatic answer mode, either because not selected before hand or because the user has selected a different option, then the phone allows the user or voice mail to answer the phone or allows the call to go unanswered as the case may be (step 418). If the phone is in automatic answer mode, then the phone answers the call by providing the calling party with a prerecorded or generated voice message indicating that the user will be with them shortly and to please stay on the line (step 408). Alternatively, the phone may generate a text message and transmit the text message alone or in combination with the voice message to the caller indicating that the user will take the call momentarily. The phone is then placed in mute mode either simultaneously with or shortly after answering the phone call thus preventing the transmission of sound from the user's locale to the caller (step 410). Thus, if the user is engaged in a private conversation with others, those conversations will not be overheard by the caller.

The phone then waits for the user to take the call (step 412). The user may indicate that he is ready to take the call by pressing a special key or key sequence on a keypad on the phone. The phone continues to wait (step 412) until it determines that the user has taken the call (step 414). Once it has been determined that the user has taken the call, then the phone is taken off of mute mode and the user is allowed to begin conversing with the caller (step 416).

Figure 5:
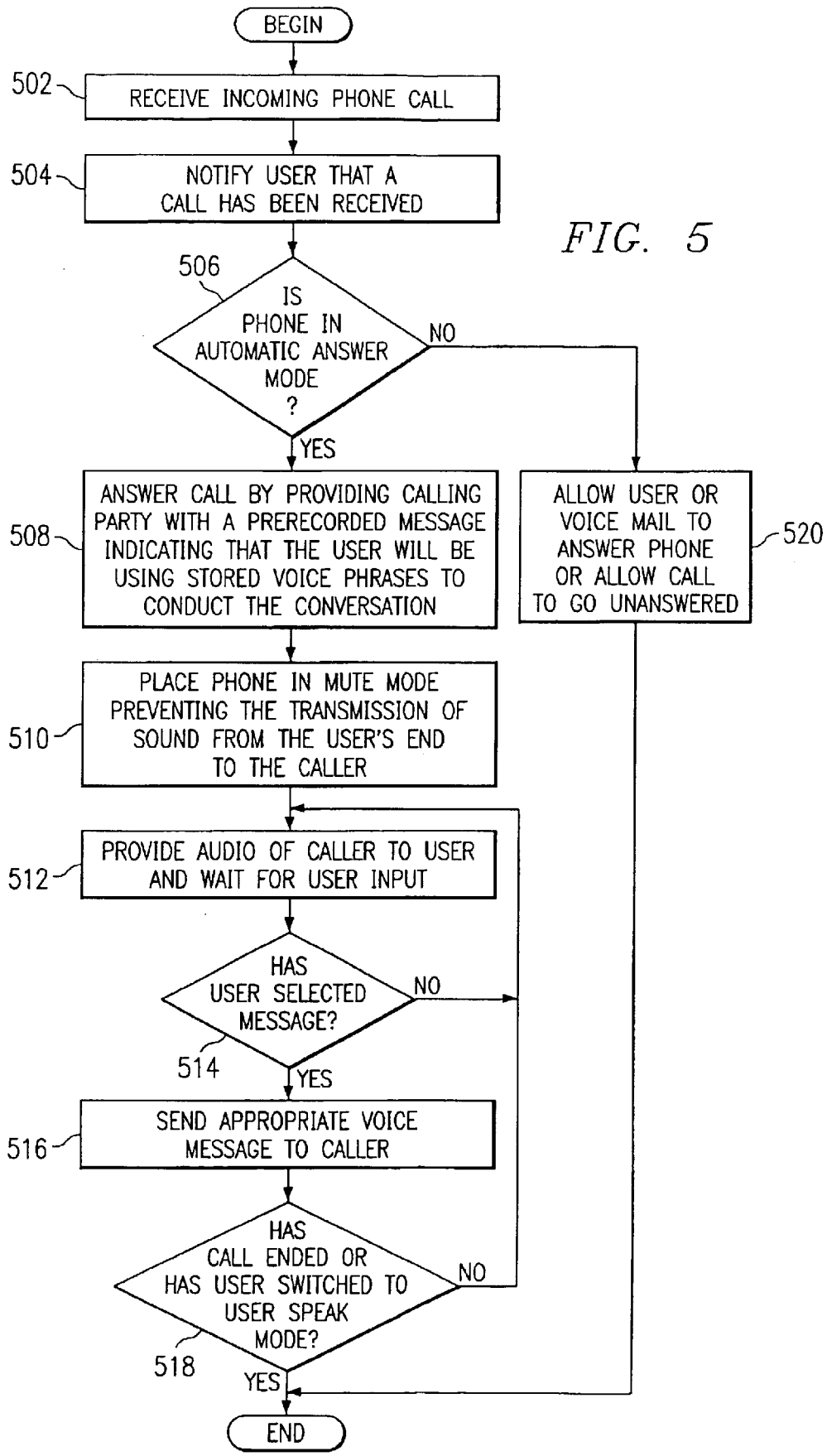
FIG. 5 depicts a process flow and program function for answering a telephone and carrying on a conversation using prerecorded phrases selectable by a user in accordance with the present invention.

With reference now to FIG. 5, a process flow and program function for answering a telephone and carrying on a conversation using prerecorded phrases selectable by a user in accordance with the present invention. This process flow may be implemented on a wireless phone such as, for example, wireless phone 300 in FIG. 3. To begin, the telephone receives an incoming phone call (step 502). The phone notifies the user that a call has been received (step 504) such as, for example, by causing the phone to vibrate and/or light up. The phone then determines whether the user has placed the phone in automatic answer mode (step 506). If the phone has been configured to allow the user to be notified of the phone call prior to placing the phone in automatic answer mode, the phone may present the user with a menu of options allowing the user to select whether he wishes to answer the phone, allow voice mail to answer the call, let the call go unanswered, or have the automatic answer system answer the phone allowing the user time to find a more convenient place to talk.

If the phone is not in automatic answer mode, either because not selected before hand or because the user has selected a different option, then the phone allows the user or voice mail to answer the phone or allows the call to go unanswered as the case may be (step 520). If the phone is in automatic answer mode, then the phone answers the call by providing the calling party with a prerecorded or generated voice message indicating that the user will be conducting the conversation using stored voice phrases (step 508). Alternatively, the phone may generate a text message and transmit the text message alone or in combination with the voice message to the caller indicating that the user will take the call momentarily. The phone is then placed in mute mode either simultaneously with or shortly after answering the phone call thus preventing the transmission of sound from the user's locale to the caller (step 510). Thus, if the user is engaged in a private conversation with others, those conversations will not be overheard by the caller.

The phone then provides the user with audio from the caller, waits for user input (step 512), and determines whether he user has selected a message (step 514). If the user has not selected a message, then the phone continues to provide audio from the caller and waits for user input (step 512). If the user has selected a message, then the phone retrieves the appropriate voice message corresponding to the selection and transmits the message to the caller (step 516). The phone then determines whether the phone call has ended or if the user has switched to user speak mode in which the user conducts the conversation in the normal manner by speaking into the phone (step 518). If the yes, then the voice phrases session ends. If not, then the phone continues to provide the user with audio of the caller and wait for further user input (step 512).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for answering a wireless telephone, the method comprising:
   receiving an incoming call;
   responsive to a determination that automatic call answering has been selected by a user, answering the incoming call by providing the calling party with an indication that the user will take the call momentarily and placing the wireless telephone in mute mode until the user has taken the incoming call, wherein the indication that the user will take the call momentarily provides an indication to the calling party that the user will be using a speech phrase generator to conduct a conversation.

2. The method as recited in claim 1, further comprising:
   providing audio of the calling party to the user; and
   responsive to selection of a speech phrase by the user, sending a speech phrase to the calling party.

3. The method as recited in claim 2, wherein the speech phrase is prerecorded.

4. The method as recited in claim 2, wherein the speech phrase is generated using a voice generation unit.

5. The method as recited in claim 1, further comprising:
   notifying the user of the incoming call; and
   presenting the user with options as to how to dispose of the call.

6. The method as recited in claim 1, wherein the options include allowing automatic call answering to answer the incoming call and at least one of allowing the user to answer the incoming call, allowing voice mail to take the incoming call, and allowing the incoming call to go unanswered.

7. The method as recited in claim 1, wherein the step of providing the calling party with an indication that the user will take the call momentarily includes sending a voice message to the calling party.

8. The method as recited in claim 7, wherein the voice message is a prerecorded message.

9. The method as recited in claim 7, wherein the voice message is generated by a voice generation unit.

10. The method as recited in claim 1, wherein the step of providing the calling party with an indication that the user will take the call momentarily includes sending a text message to the calling party.

11. The method as recited in claim 1, wherein the step of providing the calling party with an indication that the user will take the call momentarily comprises a selectable message selected from a plurality of possible messages.

12. The method as recited in claim 11, wherein the selectable message is selected based on the identity of the calling party.

13. The method as recited in claim 11, wherein the selectable message is selected based on the time.

14. The method as recited in claim 11, wherein the selectable message is selected by the user.

15. A computer program product in a computer readable media for use in a wireless telephone for answering the wireless telephone, the computer program product comprising:

first instructions for receiving an incoming call;

second instructions, responsive to a determination that automatic call answering has been selected by a user, for answering the incoming call by providing the calling party with an indication that the user will take the call momentarily and placing the wireless telephone in mute mode until the user has taken the incoming call, wherein the indication that the user will take the call momentarily provides an indication to the calling party that the user will be using a speech phrase generator to conduct a conversation.

16. The computer program product as recited in claim 15, further comprising:

third instructions for providing audio of the calling party to the user; and fourth instructions, responsive to selection of a speech phrase by the user, for sending a speech phrase to the calling party.

17. The computer program product as recited in claim 16, wherein the speech phrase is prerecorded.

18. The computer program product as recited in claim 16, wherein the speech phrase is generated using a voice generation unit.

19. The computer program product as recited in claim 15, further comprising:

third instructions for notifying the user of the incoming call; and fourth instructions for presenting the user with options as to how to dispose of the call.

20. The computer program product as recited in claim 15, wherein the options include allowing automatic call answering to answer the incoming call and at least one of allowing the user to answer the incoming call, allowing voice mail to take the incoming call, and allowing the incoming call to go unanswered.

21. The computer program product as recited in claim 15, wherein the instructions for providing the calling party with an indication that the user will take the call momentarily includes sending a voice message to the calling party.

22. The computer program product as recited in claim 21, wherein the voice message is a prerecorded message.

23. The computer program product as recited in claim 21, wherein the voice message is generated by a voice generation unit.

24. The computer program product as recited in claim 15, wherein the instructions for providing the calling party with an indication that the user will take the call momentarily includes sending a text message to the calling party.

25. The computer program product as recited in claim 15, wherein the instructions for providing the calling party with an indication that the user will take the call momentarily comprises a selectable message selected from a plurality of possible messages.

26. The computer program product as recited in claim 25, wherein the selectable message is selected based on the identity of the calling party.

27. The computer program product as recited in claim 25, wherein the selectable message is selected based on the time.

28. The computer program product as recited in claim 25, wherein the selectable message is selected by the user.

29. A wireless telephone, the wireless telephone comprising:

a receiver which receives an incoming call;

an automatic answering unit which, responsive to a determination that automatic call answering has been selected by a user, answers the incoming call by providing the calling party with an indication that the user will take the call momentarily and placing the wireless telephone in mute mode until the user has taken the incoming call, wherein the indication that the user will take the call momentarily provides an indication to the calling party that the user will be using a speech phrase generator to conduct a conversation.

30. The wireless telephone as recited in claim 29, further comprising:

a speaker which provides audio of the calling party to the user; and a speech generator which, responsive to selection of a speech phrase by the user, sends a speech phrase to the calling party.

31. The wireless telephone as recited in claim 30, wherein the speech phrase is prerecorded.

32. The wireless telephone as recited in claim 30, wherein the speech phrase is generated using a voice generation unit.

33. The wireless telephone as recited in claim 29, further comprising:

a call notification unit which notifies the user of the incoming call; and an option presentation unit which presents the user with options as to how to dispose of the call.

34. The wireless telephone an recited in claim 29, wherein the options include allowing automatic call answering to answer the incoming call and at least one of allowing the user to answer the incoming call, allowing voice mail to take the incoming call, and allowing the incoming call to go unanswered.

35. The wireless telephone as recited in claim 29, wherein the instructions for providing the calling party with an indication that the user will take the call momentarily includes sending a voice message to the calling party.

36. The wireless telephone as recited in claim 35, wherein the voice message is a prerecorded message.

37. The wireless telephone as recited in claim 35, wherein the voice message is generated by a voice generation unit.

38. The wireless telephone as recited in claim 29, wherein providing the calling party with an indication that the user will take the call momentarily includes sending a text message to the calling party.

39. The wireless telephone as recited in claim 29, wherein providing the calling party with an indication that the user will take the call momentarily, comprises a selectable message selected from a plurality of possible messages.

40. The wireless telephone as recited in claim 39, wherein the selectable message is selected based on the identity of the calling party.

41. The wireless telephone as recited in claim 39, wherein the selectable message is selected based on the time.

42. The wireless telephone as recited in claim 39, wherein the selectable message is selected by the user.

* * * * *